United States Patent

Johnson et al.

[11] Patent Number: 5,978,455
[45] Date of Patent: Nov. 2, 1999

[54] METHOD AND SYSTEM FOR DETERMINING OPTIMAL CALL PERIODS IN ACCORDANCE WITH CALLER AND CALLEE PARAMETERS

[75] Inventors: William J. Johnson, Flower Mound, Tex.; Jingsha He, San Jose, Calif.

[73] Assignee: MCI Communications Corporation, Washington, D.C.

[21] Appl. No.: 08/862,283

[22] Filed: May 23, 1997

[51] Int. Cl.$^6$ .................................................. H04M 15/00
[52] U.S. Cl. ........................... 379/111; 379/112; 379/133; 379/113
[58] Field of Search ........................... 379/111–115, 121, 379/220–222, 130–134, 144, 127, 142, 201

[56] References Cited

U.S. PATENT DOCUMENTS

| | | | |
|---|---|---|---|
| 5,003,584 | 3/1991 | Benyacar et al. | 379/119 |
| 5,148,474 | 9/1992 | Haralambopoulos et al. | 379/111 |
| 5,473,630 | 12/1995 | Penzias et al. | 379/114 |
| 5,519,769 | 5/1996 | Weinberger et al. | 379/112 |
| 5,537,464 | 7/1996 | Lewis et al. | 379/114 |
| 5,568,541 | 10/1996 | Greene | 379/114 |
| 5,627,887 | 5/1997 | Freedman | 379/114 |
| 5,633,919 | 5/1997 | Hogan et al. | 379/115 |
| 5,793,852 | 8/1998 | Kang et al. | 379/115 |
| 5,793,854 | 8/1998 | Kashepava | 379/114 |

Primary Examiner—Curtis A. Kuntz
Assistant Examiner—Duc Nguyen

[57] ABSTRACT

A methodology for determining optimal calling periods of an automated telephone system allows a user of the automated telephone system to access billing plan and detailed rate information prior to completing a toll telephone call. The user may request billing rate information for the applicable billing rate plan by entering an entire valid DTMF sequence. The optimal call periods billing information is extracted in accordance with callee and caller parameters and when the toll telephone call is to be placed. A user accessing billing rate information can use the billing rate information to determine prior to completing the toll telephone call when the optimal billing period will occur. The user can then make an informed decision as to when to complete the toll telephone call. Upon request, the user is automatically connected to the called party and the toll telephone call is completed.

18 Claims, 3 Drawing Sheets

METHOD AND SYSTEM FOR DETERMINING OPTIMAL CALL PERIODS IN ACCORDANCE WITH CALLER AND CALLEE PARAMETERS

CROSS REFERENCE TO RELATED APPLICATIONS

The subject matter of the present application is related to co-pending U.S. application Ser. No. 08/862,288, titled "Method And System For Providing Immediate Audio Data Response Billing Information To A User", Docket No. RIC-95-107, and co-pending U.S. application Ser. No. 08/862,282, titled "Method And System For Toll Charge And Rate Inquiry Service For Portable Numbers", Docket No. RIC-96-068, both filed with the Application hereof on May 23, 1997, both assigned to the assignee hereof, and both of which are herein incorporated by reference.

FIELD OF THE INVENTION

The present invention relates generally to providing telephone billing information to a telephone system user, and more specifically to immediately providing requested telephone billing information for determining optimal call periods in accordance with caller and callee parameters in audio or data form to a telephone system user in response to a valid request by the telephone system user prior to establishing a toll telephone call connection.

BACKGROUND OF THE INVENTION

The telephone industry is currently composed of several major telephone service competitors each offering their own pricing plans and structures. The price charged to a paying party for a toll telephone call may depend on a variety of factors, including the time of the day, the day of the week, the called party's service provider in relation to the caller, where the caller is calling from, how frequently the called party is called, how the call is being paid for, any operator assistance, or any other possible pricing plan or scheme of the telephone service provider.

In the prior art, the payee of a telephone conversation had no means of requesting and receiving billing information for determining optimal call periods prior to establishing a toll telephone call connection using an automated telephone system. Specifically, a user of a telephone service currently does not have the ability with the telephone service to determine before completing a toll telephone call when would be the optimal time to place the call. The need for this type of service has become more important with the increase of telephone service competitors and individual pricing plans and schemes. The advantages of being able to determine in advance of completing a toll telephone call (with the same call) the optimal calling period include being able to better plan and budget necessary toll calls and being able to determine if a spending limit has been approached or exceeded at an appropriate time. Such a service would have important ramifications for both the personal and business markets.

There is thus an unmet need in the art for an automated telephone system to retrieve and generate billing information in response to a request by a telephone system user for determining optimal call periods in accordance with caller and callee parameters prior to establishing a toll telephone call connection.

SUMMARY AND OBJECTS OF THE INVENTION

It would be advantageous in the art for a user of a telephone system to be able to dynamically request and receive audio billing information for determining optimal call periods from an automated telephone system prior to establishing a toll telephone call connection.

It would further be advantageous in the art for a user of a telephone system to be able to dynamically request and receive datastream billing information for determining optimal call periods from an automated telephone system prior to establishing a toll telephone call connection.

Therefore, according to the present invention, an automated telephone billing system allows a telephone system user to dynamically access optimal call periods billing information. The telephone system user may access billing plan and detailed rate information by entering a valid Dual-Tone Multi-Frequency Signaling (DTMF) sequence after picking up the telephone, but prior to establishing a toll telephone call connection. The optimal call periods billing information is extracted from a billing information database in accordance with callee and caller parameters entered by the telephone system user. The optimal call periods billing information may be provided to the telephone system user either by audio or datastream means.

A telephone system user accessing optimal call period billing information can use the billing information to determine prior to establishing a toll telephone call connection whether to complete the toll telephone call to the called party now or during a more optimal period in the future. Upon request, the telephone system user is automatically connected to the called party.

It is accordingly an object of the invention for a user of a telephone system to be able to dynamically request and receive audio billing information for determining optimal call periods in accordance with caller and callee parameters from an automated telephone system.

It is accordingly further an object of the invention for a user of a telephone system to be able to dynamically request and receive datastream billing information for determining optimal call periods in accordance with caller and callee parameters from an automated telephone system.

These and other objects of the invention will become apparent from the detailed description of the invention in which numerals used throughout the description correspond to those found in the drawing figures.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

Figure 1:
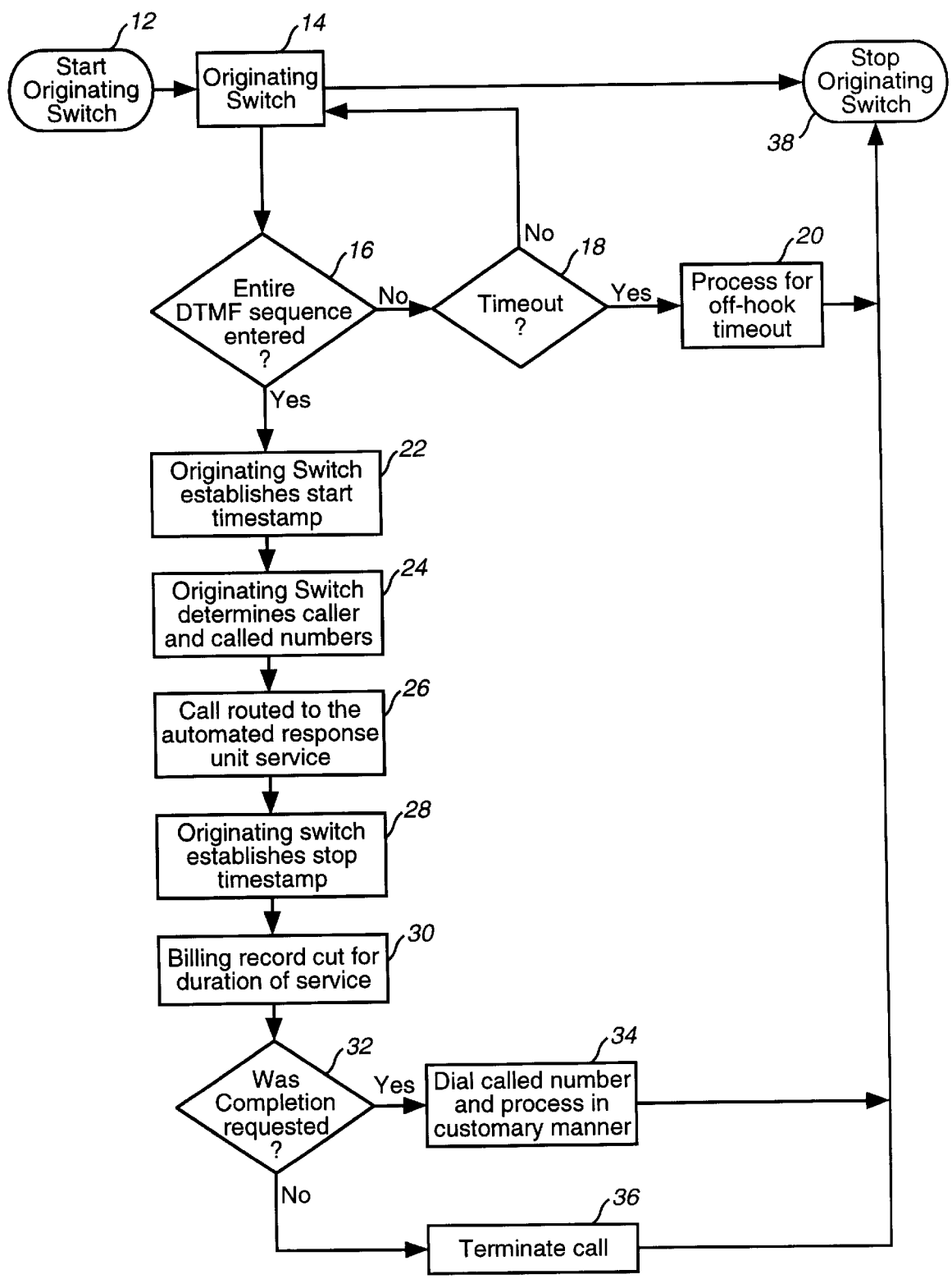
FIG. 1 is a flow chart that illustrates the billing information interaction for determining optimal call periods in accordance with caller and callee parameters at the originating switch, according to the present invention.

The present invention describes a method and system for providing immediate billing information to a telephone system user that can be used to determine optimal calling periods. The telephone system user may access billing plan and detailed rate information by entering a valid DTMF sequence after picking up the telephone, but prior to establishing a toll telephone call connection. The optimal call periods billing information is extracted from a billing information database in accordance with callee and caller parameters. The optimal call periods billing information may be provided to the telephone system user either by audio or datastream means.

In the optimal call period billing information method and system of the present invention, the originating switch provides to a telephone system user the optimal call period billing information in accordance with caller and callee parameters. By definition, the originating switch is associated with the calling party, since it is the calling party who initiates the telephone call. Once the telephone system user picks up the telephone, the originating switch is responsible for processing the telephone system user's connection.

Prior to establishing a toll telephone call connection, a telephone system user may request optimal call period billing information by entering into the user's telephone keypad a valid Dual-Tone Multi-Frequency Signaling (DTMF) sequence such as #0, for example. The originating switch monitors the telephone system for a valid DTMF sequence entered by the telephone system user. Upon entry of a valid DTMF sequence, the originating switch establishes a start timestamp and then determines the caller and called party telephone numbers. The caller and called party telephone numbers may be portable telephone numbers. The use of number portability is described in further detail in co-pending, related patent application, entitled "Method and System for Toll Charge and Rate Inquiry Service for Portable Numbers", Docket No. RIC-96-068, Ser. No. 08/862,282, filed with the Application hereof on May 23, 1997, which is herein incorporated by reference. The call is next routed to an automated response unit service, such as a voice response unit, that processes the response that is automatically generated and provided to the telephone system user.

The automated response unit service first accesses the billing plan database appropriate for the caller to called party billing plan. Next, the type of billing plan is communicated to the telephone system user while, at the same time, the caller to called billing rate database is accessed. The billing rate database is influenced by a number of parameters which may include the caller and called party telephone numbers, the time of the day of the telephone call, the day of the week of the telephone call, how the call will be paid for, and whether any operator assistance will be requested. Next, the time partitioned data menu of the billing rate database is communicated to the telephone system user audibly, visually, or by datastream. Once the telephone system user has made a selection from this menu, the billing rate information is provided to the telephone system user and the telephone system user may use this information to determine the optimal time to place the toll telephone call. The telephone system user may subsequently make requests to receive additional billing rate information.

After the telephone system user has received all billing rate information requested, the flow is released back to the originating switch. The originating switch establishes a stop timestamp and the billing record for the duration of the service is cut. If the user has requested completion of the call, the toll telephone call is processed in the customary manner. If, however, the user has not requested that the toll telephone call be completed, the call is terminated.

The operation of the present invention is best described by reference to the flow charts illustrated in FIGS. 1 and 2.

Referring first to FIG. 1, the overall flow of the methodology by which a telephone system user may request and receive billing rate information necessary to determine optimal calling periods of a toll telephone call, according to the present invention, is shown. The process starts at Start Originating Switch Block 12 and ends at Stop Originating Switch Block 38. The Originating Switch at Block 14 processes the caller's telephone call connection and begins processing the caller's connection when the telephone system user picks up the telephone and receives a dial tone prior to establishing a toll telephone call connection. As shown in FIG. 1, the Originating Switch at Block 14 continues to process the telephone system user's connection until the user hangs up the telephone.

Prior to establishing a toll telephone call connection, Decision Block 16 inquires as to whether the telephone system user has entered an entire valid DTMF sequence via the telephone key pad. The entire valid DTMF sequence will consist of a code for the service, such as #0, followed by the number to be called. Examples of invalid DTMF sequences might result from entering only the code #0, entering an invalid code followed by the number to be called, or failing to enter a code at all. If no leading #0 is detected, then the dialed digits are processed in the customary manner. If the user has not entered the entire valid DTMF sequence, Decision Block 18 inquires as to whether there has been a timeout, i.e. whether the period for response by the user has elapsed. If the period for entering an entire DTMF sequence has elapsed, then Block 20 processes the call for off-hook timeout in the ordinary and customary manner. If, however, the period for entering the entire DTMF sequence has not elapsed, then the flow returns back to Originating Switch Block 14 for detecting further DTMF sequences that may be entered.

Once the entire DTMF sequence has been entered, the flow proceeds to Block 22 where the originating switch establishes a start timestamp. As is well known in the art, a timestamp records the time and date of an event. Next, at Block 24, the originating switch determines telephone number of the caller and the called party. As will be noted, this information is used by the automated response unit service of FIG. 2. Thereafter in Block 26, the telephone call is next routed to the automated response unit of FIG. 2.

Figure 2:
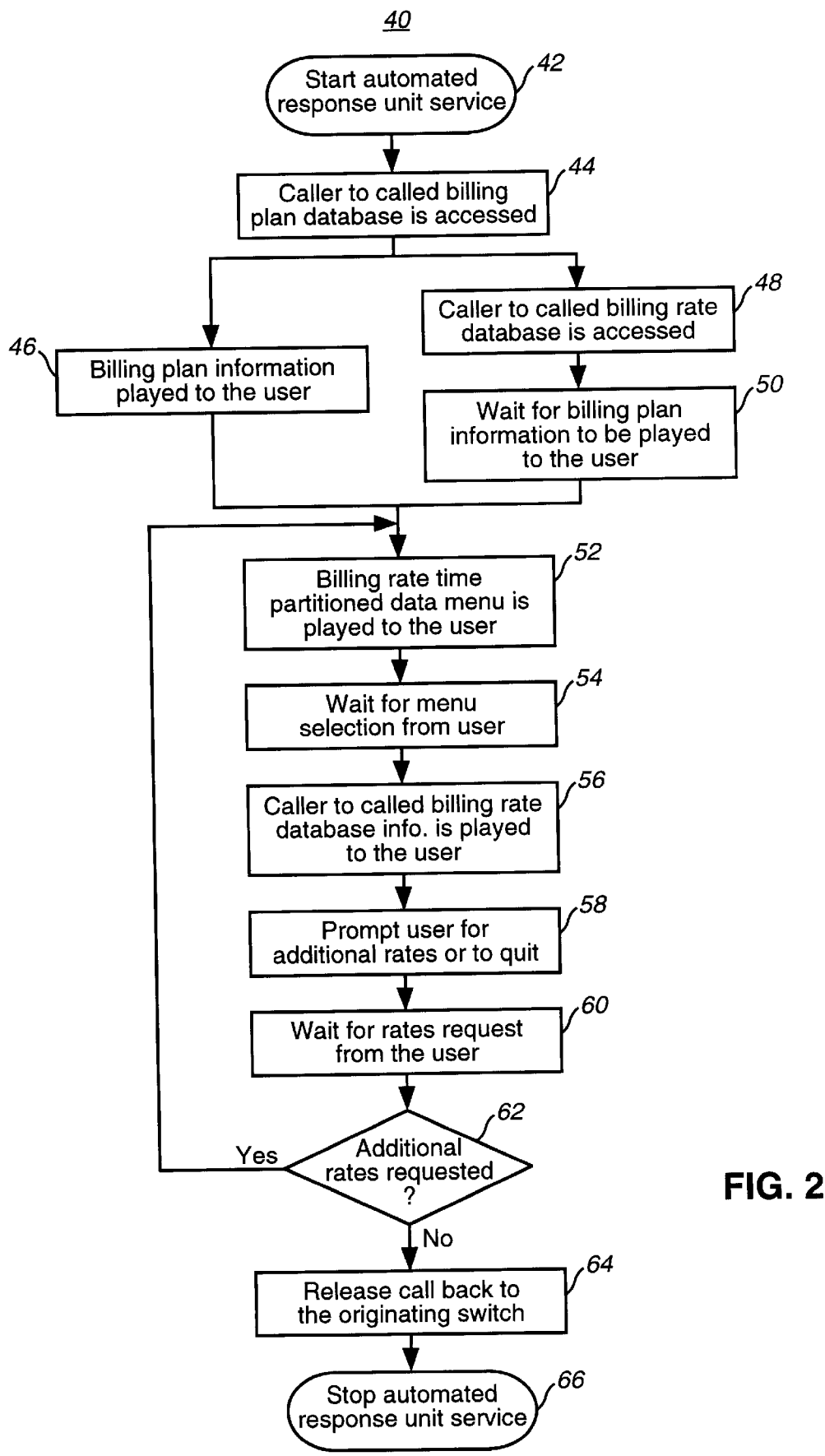
FIG. 2 is a flow chart that illustrates the operation of an automated response unit service, according to the present invention.

Referring to FIG. 2, the automated response unit service 40 of the present invention will now be described. The automated response unit service 40 is responsible for accessing and then providing to the caller relevant billing rate information about a toll telephone call to be made at some time in the future. The caller can use the billing rate information provided by the automated response unit service 40 to make an informed decision as to the optimal time to place the toll telephone call. The automated response unit service 40 can provide this information to the user in the form of audio, visual, or datastream communications. For instance, visual or datastream communications could be used by a hearing impaired caller to determine an optimal calling period. Likewise, datastream communications would be required to communicate the billing information to a computer.

A note about the functionality of an automated response unit service in the context of a telephone system is well known in the art and will be discussed just briefly here. An automated response unit (ARU) service, such as a voice response unit, typically resides on a personal computer (PC) via a TI trunk interface card, for instance. An ARU system can typically support 24 or 48 automated response unit processes with two T1 trunk interface cards connected to the telephone network. The number and arrangement of the automated response units is a function of the call loading of the telephone network. An automatic call distributor (ACD) hosts a number of automated response units (ARUs). The ACD is connected to the switches of the network. Typically, a pool of ACDs which are accessible to switches in the network are used to properly balance traffic to the ARUs.

The first step after starting the automatic response unit service at Block 42 is to access the caller to called party billing database, as shown at Block 44. Next, at Block 46, the type of billing plan that is determined to apply to the proposed toll telephone call is communicated to the caller. Block 46 also informs the user that the toll telephone call will be automatically completed simply by entering an appropriate DTMF sequence, such as the "#" key. Simultaneously with this, the billing rate database applicable to the proposed toll telephone call is accessed at Block 48 and the flow pauses at Block 50 until the billing plan information has been communicated to the caller at Block 46. Billing plan information played to the user at Block 46 includes information such as MCI "Friends and Family"™, MCI Employees, MCI Special Program Offerings, or the like. In a broader sense, the billing plan information is the class of the call respective to the caller number, the called number, and the program(s) associated with those numbers.

Once the billing plan type has been communicated to the caller and the relevant billing rate database has been accessed, the flow continues to Block 52. A menu of billing rate time-partitioned data is communicated to the caller. For example, billing rate information for rates along with DTMF options for selecting those rates are presented to the user. Consider the following menu that may be presented to the user:

1. weekdays 8:00 a.m.–4:59 p.m.
2. weekdays 5:00 p.m.–10:59 p.m.
3. weekdays 11:00 p.m.–7:59 a.m.
4. weekends 8:00 a.m.–4:59 p.m.
5. weekends 5:00 p.m.–10:59 p.m.
6. weekends 11:00 p.m.–7:59 a.m.

Block 52 could alternately provide the "#" key direction that Block 46 provided. Block 52 accesses billing rate information from the billing rate information database depicted in FIG. 3 and discussed therewith. There is a unique billing rate information database for each type of billing plan identified at Block 44. A billing plan database accessed at Block 44 contains every program provided to a customer with member telephone numbers or wildcard telephone numbers.

At Block 54, the caller makes a menu selection. At Block 56, the billing rate database information for the caller's menu selection is communicated to the caller. Next, at Block 58, the caller is prompted to ask for additional billing rates to be provided or to quit. The flow pauses at Block 60 while the caller is given time to request additional billing rate information. Decision Block 62 inquires as to whether the caller has requested additional billing rate information. If the caller has not requested additional billing rate information or if a timeout has occurred, Block 64 illustrates that the call is released back to the originating switch to Block 28 and automated response unit service 40 is stopped as shown at Block 66. If, however, the caller has requested additional billing rate information, then the flow returns to Block 52.

It must be noted that there are three conditions which can cause the telephone call to be released back to the originating switch from the ARU of FIG. 2, as illustrated in Block 64. The first condition is that any time the caller hangs up the telephone, the call will be released back to the originating switch so that a stop timestamp may be established. The second condition is that any time the caller enters an appropriate DTMF code for performing the call (e.g. the "#" key) the call is released back to the originating switch. The third condition, of course, is illustrated by Blocks 62 and 64. If the caller does not request additional billing rate information, at Block 64 the telephone call is released back to the originating switch.

Consider the following example of the automatic response unit service 40. Suppose that at Block 54 the caller makes a menu selection to hear the rate that would apply for placing the call. At Block 56, the automatic response unit service 40 would convey to the caller how much it would cost to place the call immediately. At Block 58, the caller is prompted to quit or to request additional billing rate information and Block 60 waits for the caller's response. If the caller has elected to quit, then the call is released back to Block 28 of FIG. 1. If, however, the caller has requested more billing rate information, the flow returns to Block 52 where the billing rate time-partitioned data menu is again communicated to the caller. If, alternately, the caller enters the "#" key, then the call is released back to Block 28 of FIG. 1 for performing the call. If, however, the caller hangs up, then the call is released back to Block 28 of FIG. 1 for proper call termination.

After the ARU service of FIG. 2 is completed, the flow returns back to Block 28 of FIG. 1. In Block 28, the originating switch establishes a stop timestamp. In Block 30, a billing record is cut for the duration of the service. Alternately, it is envisioned that a single flat fee may be charged for each billing rate query made by the user (similar to the 555-1212 directory service fee). Decision Block 32 inquires as to whether the user has requested performing the toll telephone call. If the user had requested performing the toll telephone call, the flow continues to Block 34. Block 34 dials the called number and processes the toll telephone call in the customary manner. The flow next continues to Stop Originating Switch Block 38. If, however, the user has not requested performing the toll telephone call, the call is terminated at Block 36. After Block 36, the flow continues to Stop Originating Switch Block 38.

Figure 3:
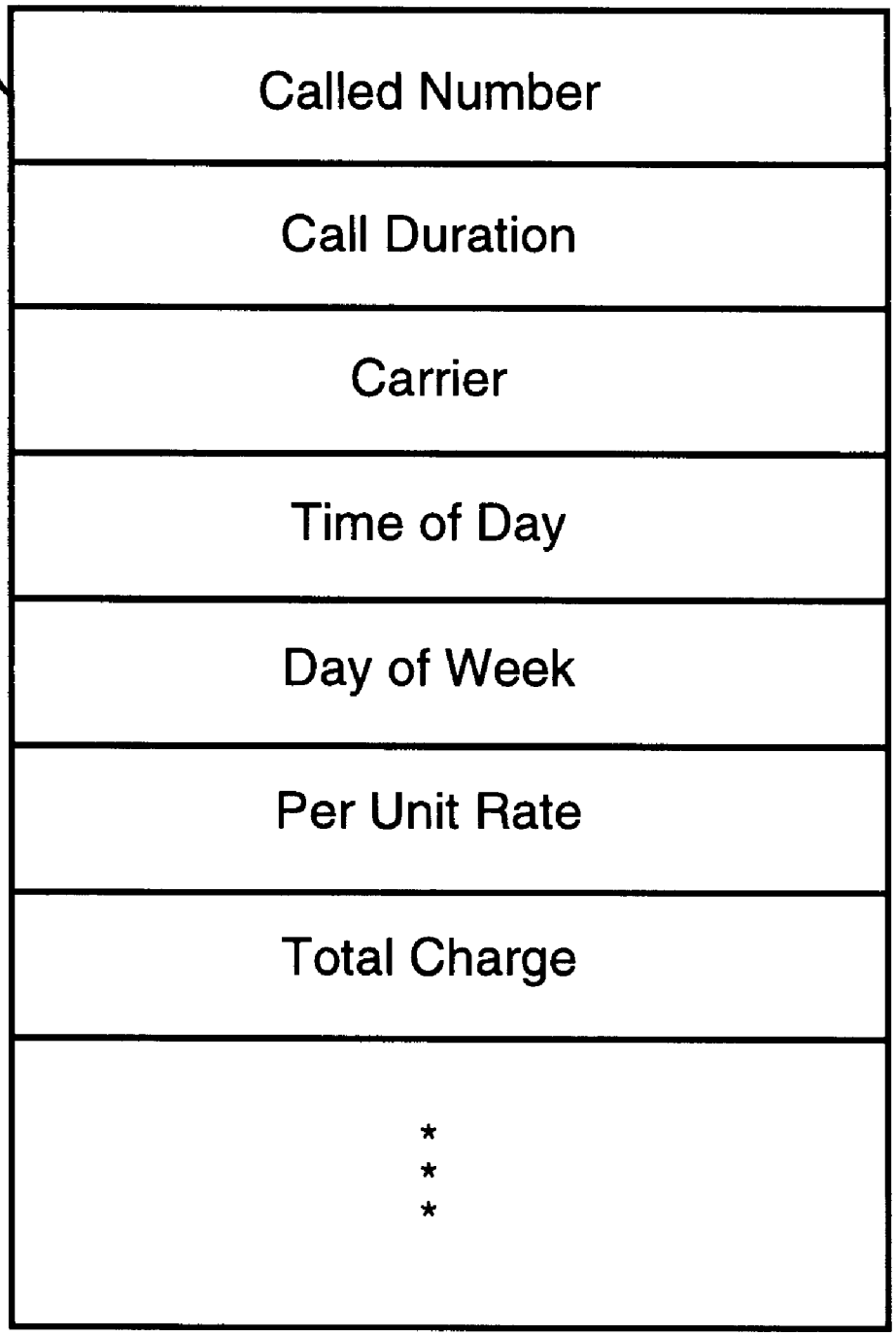
FIG. 3 is a data representation of the billing rate information database, according to the present invention.

Referring to FIG. 3, a data representation of the billing rate information database 70 of the present invention is shown. A Billing Record 72 of the billing information database may typically contain the following information: the telephone number called; the total call duration; the carrier for the party paying the toll; the starting time of the telephone call; day of the week information such as whether this is a weekend or weekday; the per unit rate such as cost per minute; and the total charge of the telephone call. There is a unique billing rate database for each calling plan identified for the caller and the called numbers.

The present advantage provides an important advantage over the prior art in that it provides a methodology by which a telephone system user can access billing rate information prior to completing a toll telephone call in order to determine the optimal calling period for the toll telephone call. A telephone system user provided with billing rate information can then decide to immediately complete the toll telephone call or to wait to a later, more optimal billing period.

While the invention has been particularly shown and described with reference to a preferred embodiment, it will be understood by those skilled in the art that various changes in form and detail may be made therein without departing from the spirit and scope of the invention.

What is claimed is:

1. A method for providing billing rate information to a user of an originating switch automated telephone system after the user is connected to said originating switch and prior to the user completing a telephone call, said method comprising:

monitoring the automated telephone system for a valid sequence entered by the user prior to the entering of called party digits used for establishing a telephone call connection;

establishing a start timestamp of a billing rate information service when the user has entered the valid sequence prior to establishing the telephone call connection;

determining the telephone number of the user and the telephone number dialed by the user;

routing the telephone call to an automated response unit service that provides billing rate information to the user prior to the user completing the telephone call;

releasing the telephone call back to the originating switch;

establishing a stop timestamp of the billing rate information service;

inquiring whether the user would like to complete the telephone call; and completing the telephone call if the user has indicated to complete the telephone call and not completing the telephone call if the user has indicated to not complete the telephone call.

2. The method of claim 1, wherein after establishing a stop timestamp and prior to inquiring whether the user would like to complete the telephone call, further comprising:

cutting a billing record for the duration of the billing rate information service, wherein the duration of the billing rate information service is determined by the start timestamp and the stop timestamp.

3. The method of claim 1, wherein monitoring the automated telephone system for a valid sequence entered by the user is accomplished by the originating switch.

4. The method of claim 1, wherein releasing the telephone call back to the originating switch is triggered when the user enters a valid termination sequence for automatically performing the telephone call.

5. The method of claim 1, wherein releasing the telephone call back to the originating switch is triggered when the user indicates a desire to receive no more billing rate information.

6. The method of claim 1, wherein the automated response unit service provides billing rate information to the user prior to the user completing the telephone call by performing the following:

accessing the applicable billing plan determined by the telephone number of the user and the telephone number dialed by the user;

providing billing rate information on the type of the applicable billing plan to the user;

simultaneously to providing billing rate information on the type of the applicable billing plan to the user, accessing a billing rate database of the applicable billing plan;

providing a selectable billing rate menu to the user from which the user can select to receive time-partitioned billing information from the billing rate database;

after the user has made a selection from the selectable billing rate menu, providing the requested time-partitioned billing information to the user;

prompting the user to make an additional selection from the selectable billing rate menu; and if the user does not make an additional selection from the selectable billing rate menu, releasing the telephone call back to the originating switch, and if the user does make an additional selection from the selectable billing rate menu, providing the requested time-partitioned billing information to the user.

7. A method for providing billing rate information to a user of an originating switch automated telephone system after the user is connected to said originating switch and prior to the user completing a telephone call, said method comprising:

monitoring the automated telephone system for a valid sequence entered by the user prior to the entering of called party digits used for establishing a telephone call connection;

establishing a start timestamp of a billing rate information service when the user has entered the valid sequence prior to establishing the telephone call connection, and not establishing the start timestamp when the user has not entered the valid sequence prior to establishing the telephone call connection;

determining the telephone number of the user and the telephone number dialed by the user;

routing the telephone call to an automated response unit service that provides billing rate information to the user prior to the user completing the telephone call;

releasing the telephone call back to the originating switch;

establishing a stop timestamp of the billing rate information service;

cutting a billing record for the duration of the billing rate information service, wherein the duration of the billing rate information service is determined by the start timestamp and the stop timestamp;

inquiring whether the user would like to complete the telephone call; and completing the telephone call if the user has indicated to complete the telephone call and not completing the telephone call if the user has indicated to not complete the telephone call.

8. The method of claim 7, wherein when the user has not entered the valid sequence prior to establishing the telephone call connection, the originating switch waits for the user to enter the valid sequence for a predetermined period of time.

9. The method of claim 8, wherein if the user still has not entered the valid sequence during the predetermined period of time, the telephone call is processed for an off-hook timeout condition.

10. The method of claim 7, wherein releasing the telephone call back to the originating switch is triggered when the user enters a valid termination sequence for automatically performing the telephone call.

11. The method of claim 7, wherein the automated response unit service provides billing rate information to the user prior to the user completing the telephone call by performing the following:

accessing the applicable billing plan determined by the telephone number of the user and the telephone number dialed by the user;

providing information on the type of the applicable billing plan to the user;

simultaneously to playing information on the type of the applicable billing plan to the user, accessing a billing rate database of the applicable billing plan;

providing a selectable billing rate menu to the user from which the user can select to receive time-partitioned billing information from the billing rate database;

after the user has made a selection from the selectable billing rate menu, providing the requested time-partitioned billing information to the user;

prompting the user to make an additional selection from the selectable billing rate menu;

if the user does not make an additional selection from the selectable billing rate menu, releasing the telephone call back to the originating switch, and if the user does make an additional selection from the selectable billing rate menu, providing the requested time-partitioned billing information to the user.

12. A method of providing a calling party with call rates prior to completing a call connection to a called party from an automated telephone system comprising:

monitoring, at an automated telephone system originating switch of a calling party user requesting service, for a given sequence of inputs entered by said user signifying a billing rate data request prior to entering the called party digits;

determining the telephone number of the calling party user and the telephone number of a party to be called;

routing the request to an automated response unit service that provides billing rate information to the user prior to said user completing a telephone call; and releasing the call back to the originating switch whereby said user may, upon a review of received billing information, signify to said automated telephone system that a connection should be completed to said party to be called.

13. Apparatus for providing a calling party with call rates prior to completing a call connection to a called party from an automated telephone system comprising:

monitoring means, at an automated telephone system originating switch of a calling party user requesting service, for detecting a given sequence of inputs entered by said user signifying a billing rate data request prior to entering the called party digits;

means for determining the telephone number of the calling party user and the telephone number of a party to be called;

routing means for directing the request to an automated response unit service that provides billing rate information to the user prior to said user completing a telephone call; and means for releasing the call back to the originating switch whereby said user may, upon a review of received billing information, signify to said automated telephone system that a connection should be completed to said party to be called.

14. A method for providing billing rate information to a user of an originating switch automated telephone system prior to the user completing a telephone call, said method comprising:

monitoring the automated telephone system for a valid sequence entered by the user prior to establishing a telephone call connection;

establishing a start timestamp of a billing rate information service when the user has entered the valid sequence prior to establishing the telephone call connection;

determining the telephone number of the user and the telephone number dialed by the user;

routing the telephone call to an automated response unit service that provides billing rate information to the user prior to the user completing the telephone call; and releasing the telephone call back to the originating switch, wherein releasing the telephone call back to the originating switch is triggered when the user enters a valid termination sequence for automatically performing the telephone call;

establishing a stop timestamp of the billing rate information service;

inquiring whether the user would like to complete the telephone call; and completing the telephone call if the user has indicated to complete the telephone call and not completing the telephone call if the user has indicated to not complete the telephone call.

15. A method for providing billing rate information to a user of an originating switch automated telephone system prior to the user completing a telephone call, said method comprising:

monitoring the automated telephone system for a valid sequence entered by the user prior to establishing a telephone call connection;

establishing a start timestamp of a billing rate information service when the user has entered the valid sequence prior to establishing the telephone call connection;

determining the telephone number of the user and the telephone number dialed by the user;

routing the telephone call to an automated response unit service that provides billing rate information to the user prior to the user completing the telephone call;

releasing the telephone call back to the originating switch, wherein releasing the telephone call back to the originating switch is triggered when the user indicates a desire to receive no more billing rate information;

establishing a stop timestamp of the billing rate information service;

inquiring whether the user would like to complete the telephone call; and completing the telephone call if the user has indicated to complete the telephone call and not completing the telephone call if the user has indicated to not complete the telephone call.

16. A method for providing billing rate information to a user of an originating switch automated telephone system prior to the user completing a telephone call, said method comprising:

monitoring the automated telephone system for a valid sequence entered by the user prior to establishing a telephone call connection;

establishing a start timestamp of a billing rate information service when the user has entered the valid sequence prior to establishing the telephone call connection;

determining the telephone number of the user and the telephone number dialed by the user;

routing the telephone call to an automated response unit service that provides billing rate information to the user prior to the user completing the telephone call;

releasing the telephone call back to the originating switch;

establishing a stop timestamp of the billing rate information service;

inquiring whether the user would like to complete the telephone call; and completing the telephone call if the user has indicated to complete the telephone call and not completing the telephone call if the user has indicated to not complete the telephone call, wherein providing billing rate information to the user prior to the user completing the telephone call comprises the steps of:

accessing the applicable billing plan determined by the telephone number of the user and the telephone number dialed by the user;

providing billing rate information on the type of the applicable billing plan to the user;

simultaneously to providing billing rate information on the type of the applicable billing plan to the user, accessing a billing rate database of the applicable billing plan;

providing a selectable billing rate menu to the user from which the user can select to receive time-partitioned billing information from the billing rate database;

after the user has made a selection from the selectable billing rate menu, providing the requested time-partitioned billing information to the user;

prompting the user to make an additional selection from the selectable billing rate menu; and if the user does not make an additional selection from the selectable billing rate menu, releasing the telephone call back to the originating switch, and if the user does make an additional selection from the selectable billing rate menu, providing the requested time-partitioned billing information to the user.

17. A method for providing billing rate information to a user of an originating switch automated telephone system prior to the user completing a telephone call, said method comprising:

monitoring the automated telephone system for a valid sequence entered by the user prior to establishing a telephone call connection;

establishing a start timestamp of a billing rate information service when the user has entered the valid sequence prior to establishing the telephone call connection, and not establishing the start timestamp when the user has not entered the valid sequence prior to establishing the telephone call connection;

determining the telephone number of the user and the telephone number dialed by the user;

routing the telephone call to an automated response unit service that provides billing rate information to the user prior to the user completing the telephone call;

releasing the telephone call back to the originating switch when the user enters a valid termination sequence for automatically performing the telephone call;

establishing a stop timestamp of the billing rate information service;

cutting a billing record for the duration of the billing rate information service, wherein the duration of the billing rate information service is determined by the start timestamp and the stop timestamp;

inquiring whether the user would like to complete the telephone call; and completing the telephone call if the user has indicated to complete the telephone call and not completing the telephone call if the user has indicated to not complete the telephone call.

18. A method for providing billing rate information to a user of an originating switch automated telephone system prior to the user completing a telephone call, said method comprising:

monitoring the automated telephone system for a valid sequence entered by the user prior to establishing a telephone call connection;

establishing a start timestamp of a billing rate information service when the user has entered the valid sequence prior to establishing the telephone call connection, and not establishing the start timestamp when the user has not entered the valid sequence prior to establishing the telephone call connection;

determining the telephone number of the user and the telephone number dialed by the user;

routing the telephone call to an automated response unit service that provides billing rate information to the user prior to the user completing the telephone call;

releasing the telephone call back to the originating switch;

establishing a stop timestamp of the billing rate information service;

cutting a billing record for the duration of the billing rate information service, wherein the duration of the billing rate information service is determined by the start timestamp and the stop timestamp;

inquiring whether the user would like to complete the telephone call; and completing the telephone call if the user has indicated to complete the telephone call and not completing the telephone call if the user has indicated to not complete the telephone call, wherein providing billing rate information to the user prior to the user completing the telephone call comprises the steps of:

accessing the applicable billing plan determined by the telephone number of the user and the telephone number dialed by the user;

providing information on the type of the applicable billing plan to the user;

simultaneously to playing information on the type of the applicable billing plan to the user, accessing a billing rate database of the applicable billing plan;

providing a selectable billing rate menu to the user from which the user can select to receive time-partitioned billing information from the billing rate database;

after the user has made a selection from the selectable billing rate menu, providing the requested time-partitioned billing information to the user;

prompting the user to make an additional selection from the selectable billing rate menu;

if the user does not make an additional selection from the selectable billing rate menu, releasing the telephone call back to the originating switch, and if the user does make an additional selection from the selectable billing rate menu, providing the requested time-partitioned billing information to the user.

* * * * *